MAXWELL C. GILLILAND
CHARLES H. SINGLE
JOHN A. BRUSSOLO
INVENTORS

BY
Louis J. Knobbe
ATTORNEY

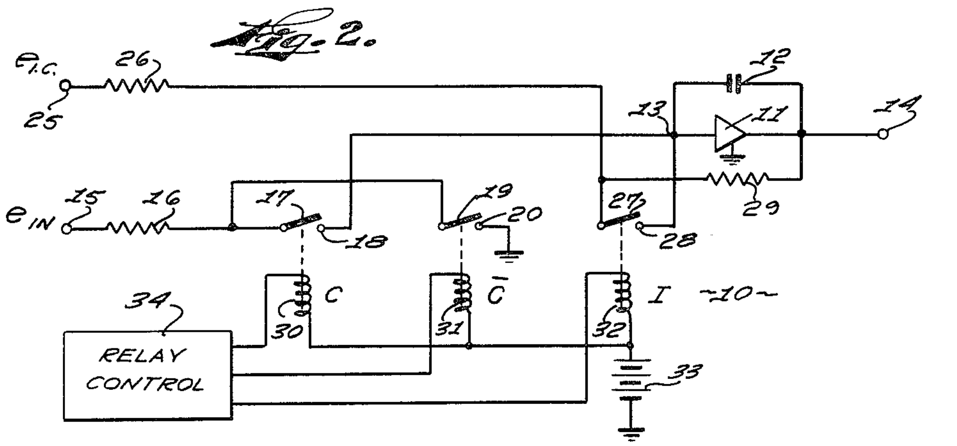
Fig. 3.
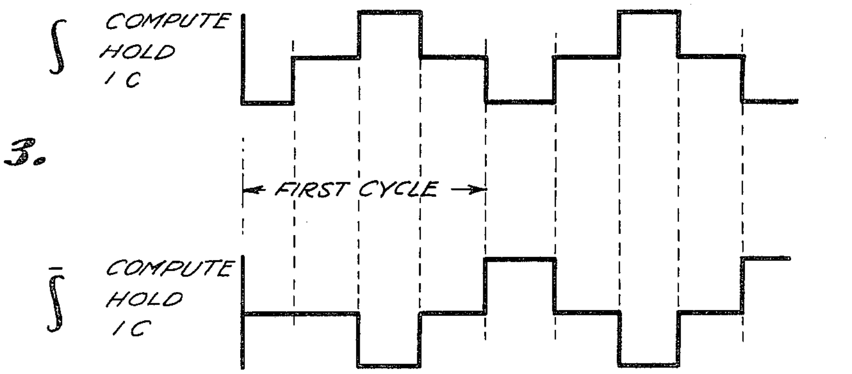
INTERATIVE OPERATION MODE CONDITION FOR NORMAL & COMPLEMETARY INTEGRATORS
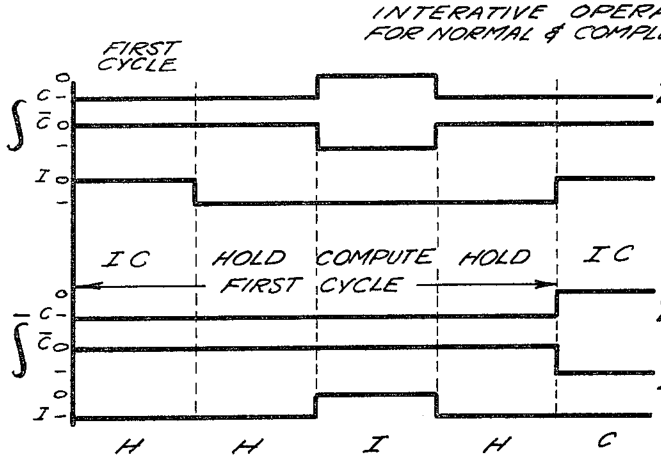
Fig. 4.
ITERATIVE OPERATION RELAY DUTY CYCLE FOR NORMAL & COMPLEMENTARY INTEGRATORS
MAXWELL C. GILLILAND
CHARLES H. SINGLE
JOHN A. BRUSSOLO
INVENTORS
BY Louis J. Knobbe
ATTORNEY

ITERATIVE ANALOG COMPUTER

Filed Nov. 28, 1961 6 Sheets-Sheet 3

MAXWELL C. GILLILAND
CHARLES H. SINGLE
JOHN A. BRUSSOLO
INVENTORS

BY Louis J. Knobbe
ATTORNEY

MAXWELL C. GILLILAND
CHARLES H. SINGLE
JOHN A. BRUSSOLO
INVENTORS

BY Louis J. Knobbe
ATTORNEY

MAXWELL C. GILLILAND
CHARLES H. SINGLE
JOHN A. BRUSSOLO
INVENTORS

BY Louis J. Knobbe
ATTORNEY

MAXWELL C. GILLILAND
CHARLES H. SINGLE
JOHN A. BRUSSOLO
INVENTORS

BY Louis G. Kobbe
ATTORNEY

United States Patent Office 3,231,723
Patented Jan. 25, 1966

3,231,723

ITERATIVE ANALOG COMPUTER

Maxwell C. Gilliland, Lafayette, Charles H. Single, Pleasant Hill, and John A. Brussolo, El Cerrito, Calif., assignors to Beckman Instruments, Inc., a corporation of California Filed Nov. 28, 1961, Ser. No. 155,437
17 Claims. (Cl. 235—150.4)

The present invention relates generally to analog computers and, more particularly, to an electronic differential analyzer having an interative operational mode. Although the term "repetitive operation" has been used heretofore to describe this general class of analog computers, the function of this invention is more appropriately described as iterative operation and will be so defined hereinafter.

The traditional electronic differential analyzer is a real-time analog computer. This means that such computers are capable of integrating the machine variables with respect to real-time and only with respect to real-time. Such computers have been extensively developed in the past decade and find wide usage for solving a variety of problems, the most common probably being the solution of linear ordinary differential equations. Other problems are, however, either unsolvable on this type of real-time computer or else solvable only after the expenditure of a great deal of time. Representative examples of such problems are the solution of partial differential equations, statistical studies, least mean-square optimization problems, boundary value problems, solution of multiple integrals, difference-differential equations, transient performance, and operations research.

In order to avoid the difficulties inherent in a real-time electronic differential analyzer, prior workers in the art have constructed repetitive electronic differential analyzers capable of working on a relatively fast time scale so that complete problem solutions are generated in a second or less. Representative such computers are described in chapter 8.5 of the book entitled, "Electronic Analog Computers" by Korn and Korn, published by the McGraw-Hill Book Co., Inc., in 1952, and chapter 12 of the book entitled, "Analog Computer Techniques," by Clarence L. Johnson, published by the McGraw-Hill Book Co., Inc., in 1956. Such computers have not, however, found wide application because of certain shortcomings in their basic design. For example, the prior art repetitive computers have required a relatively long time period to complete a repetitive cycle. Also, these computers include a substantial number of redundant components. Moreover, these computers have not readily accepted problems described by two different sets of equations where the initial conditions for each depend on previously computed data from the other. A still further disadvantage of the prior repetitive analog computers is that they lack a decimal digit control over the compute and initial condition time periods.

Accordingly, it is an object of the present invention to provide an improved electronic differential analyzer capable of very fast iterative operation.

Another object of the present invention is to provide an iterative analog computer which does not require a substantial number of redundant components.

A further object of the present invention is to provide an iterative analog computer which will readily accept a problem described by two different sets of equations where the initial conditions for each depend on previously computed data from the other.

It is another object of the present invention to provide an iterative analog computer in which the compute and initial condition time periods are under the control of decimal digit selector switches.

Other and/or further objects, features and advantages of the invention will become apparent as the description proceeds.

Briefly, in accordance with a preferred form of the present invention, there is provided an iterative analog computer having a plurality of computing elements which may be connected together and to other analog computer components by a patch board as in prior art electronic differential analyzers. Each of these computing elements includes an operational amplifier and related circuitry connected to a function selector pinboard so that the insertion of a pin on this pinboard preselects the function of the computing element from one of four operational modes. These four modes are the normal integrator, high gain amplifier and summing amplifier modes, and in addition, a novel mode hereinafter termed the "complementary integrator" mode. In both the integrate and complementary integrate modes, each of the computing elements is under the control of an iterative control device which sequences each normal integrator through sequential intervals of INITIAL CONDITION, HOLD, COMPUTE, and HOLD and each complementary integrator through corresponding sequential intervals of COMPUTE, HOLD, INITIAL CONDITION, and HOLD. Thus, both types of integrators are in HOLD intervals simultaneously; however, the normal integrator is in its INITIAL CONDITION mode when the complementary integrator is in its COMPUTE mode, and vice versa. This operation substantially advances the flexibility of the computer since the data computed by the normal integrators can be used as initial conditions for the complementary integrators, and vice versa. This affords a significant reduction in components. Moreover, a computation may be carried out which is described by two different sets of equations where the initial conditions for each depend on previously computed data from the other.

The iterative control provided by the present invention further advances the state of the analog computer art by providing a plurality of selectible time bases for the interation cycle. For each change in time base, moreover, the correct feedback capacitor for each integrator and complementary integrator is automatically selected. The intervals of INITIAL CONDITION and COMPUTE for the normal integrators (and likewise the COMPUTE and INITIAL CONDITION intervals of the complementary integrators) may also be conveniently preset to integral multiples of the time base by decimal digit selector switches.

A more thorough understanding of the invention may be obtained by a study of the following detailed description taken in connection with the accompanying drawings in which:

FIG. 2 is a simplified circuit diagram of an analog computing element constructed in accordance with the present invention;

FIG. 3 is a graphical illustration of the iterative operation mode control;

FIG. 4 is a graphical illustration of the iterative operation relay duty cycle;

Figure 8:
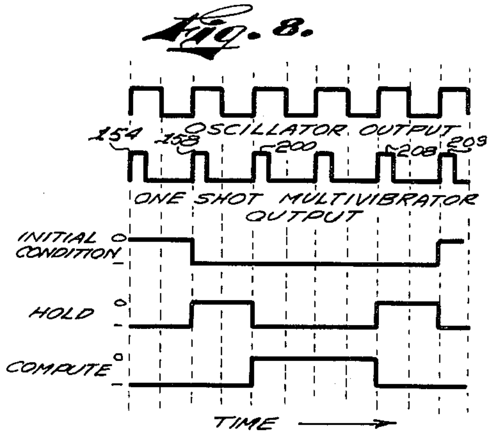
Figure 9:
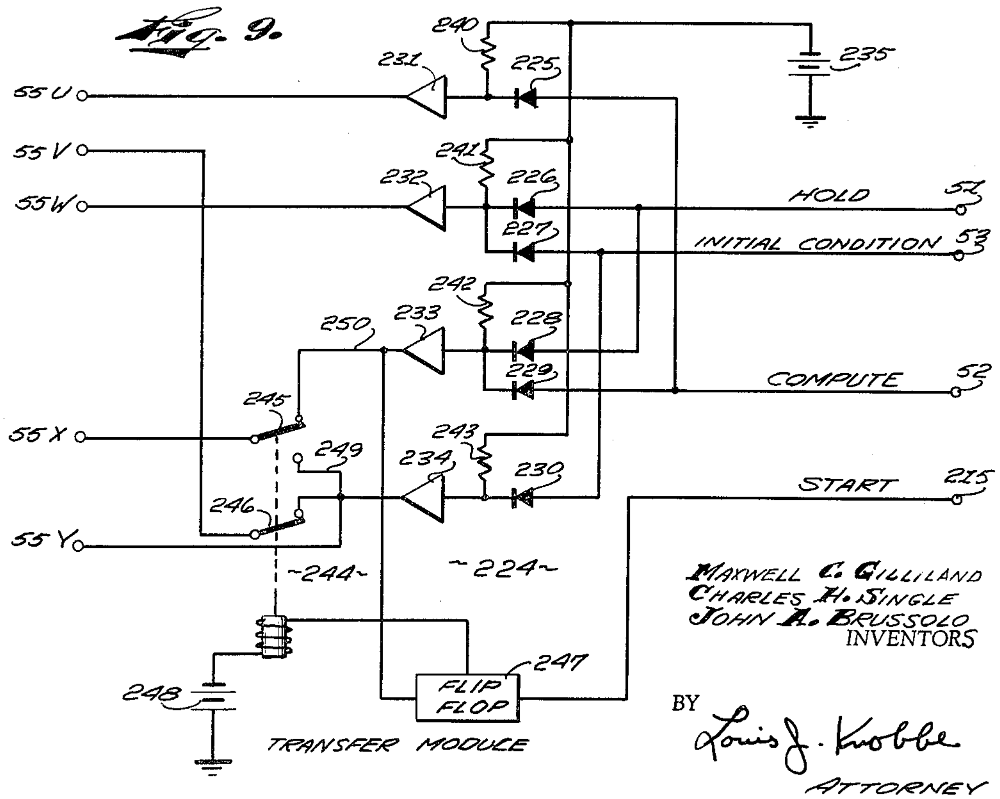
Figure 7A:
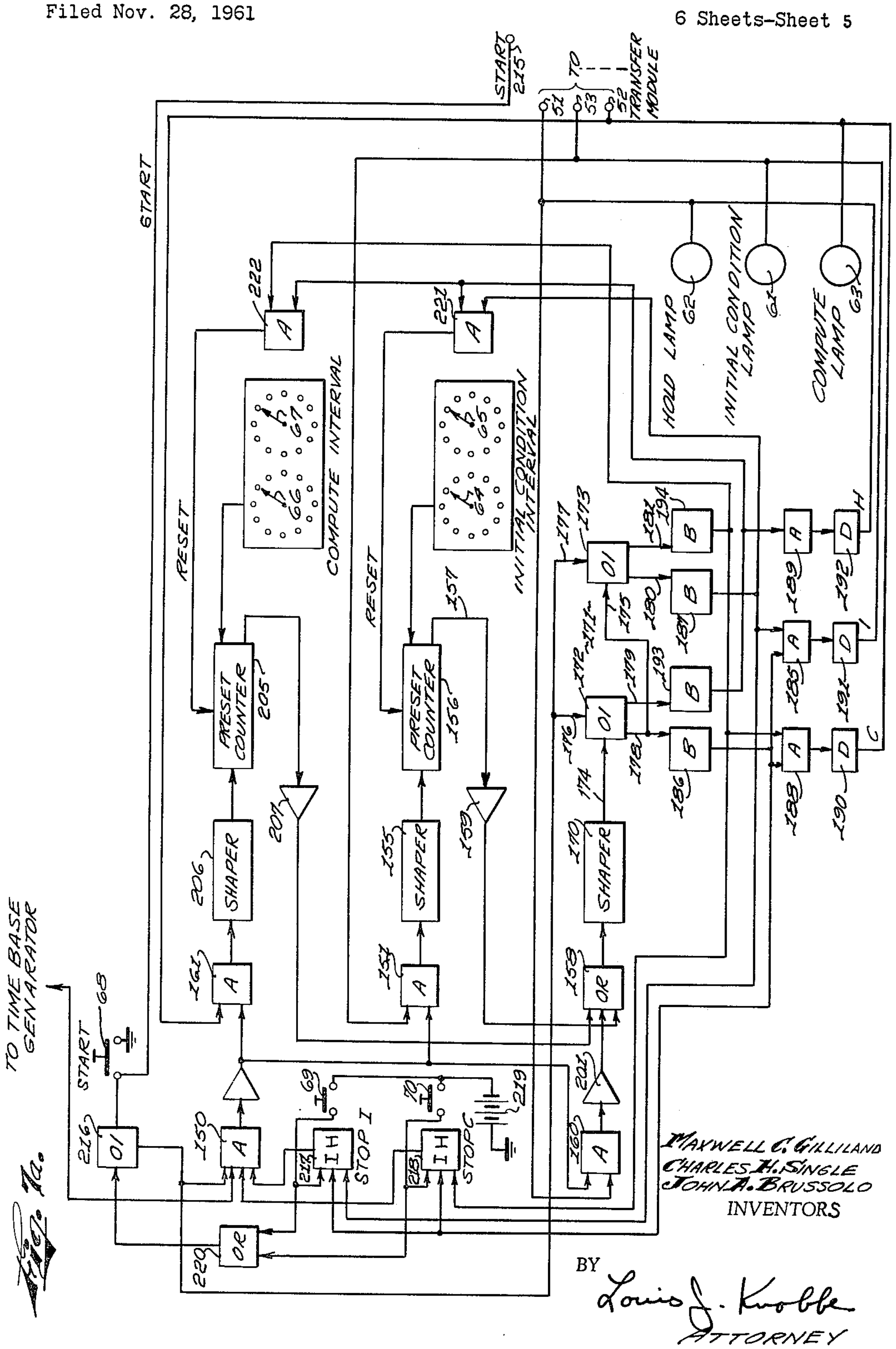
Figure 7B:
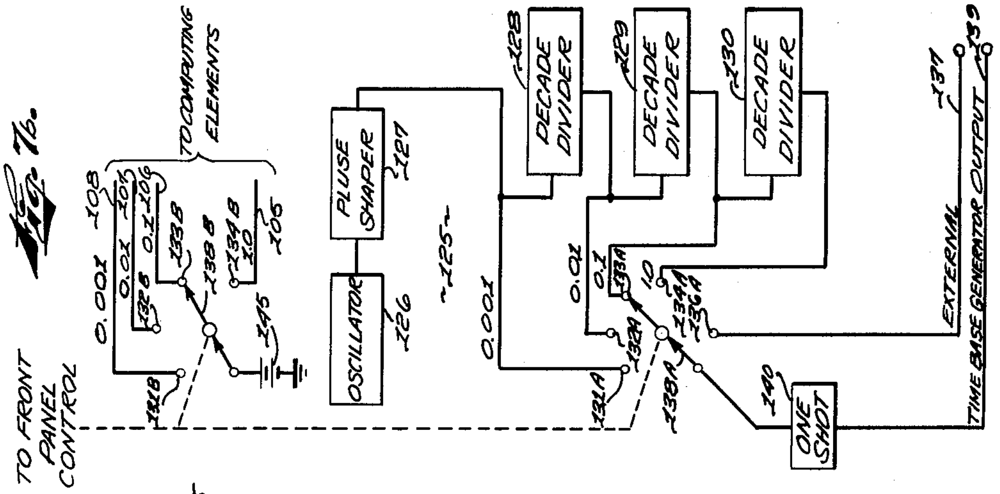

FIGS. 7*a* and 7*b* illustrate schematically the iterative control unit;

FIG. 8 illustrates several signals within the system of FIG. 7;

FIG. 9 is a circuit schematic of the transfer module; and

Figure 10:
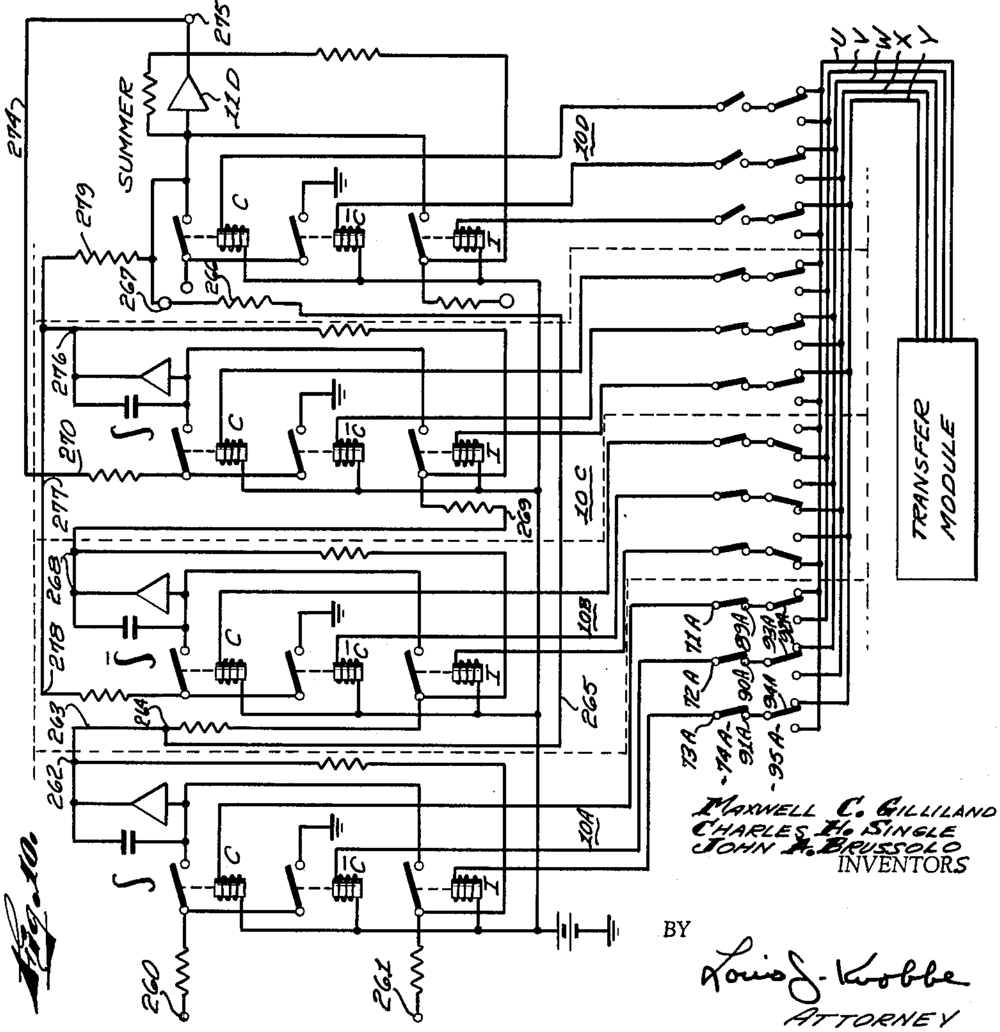

FIG. 10 is a schematic diagram showing four analog computing elements interconnected in a representative manner.

Figure 1:
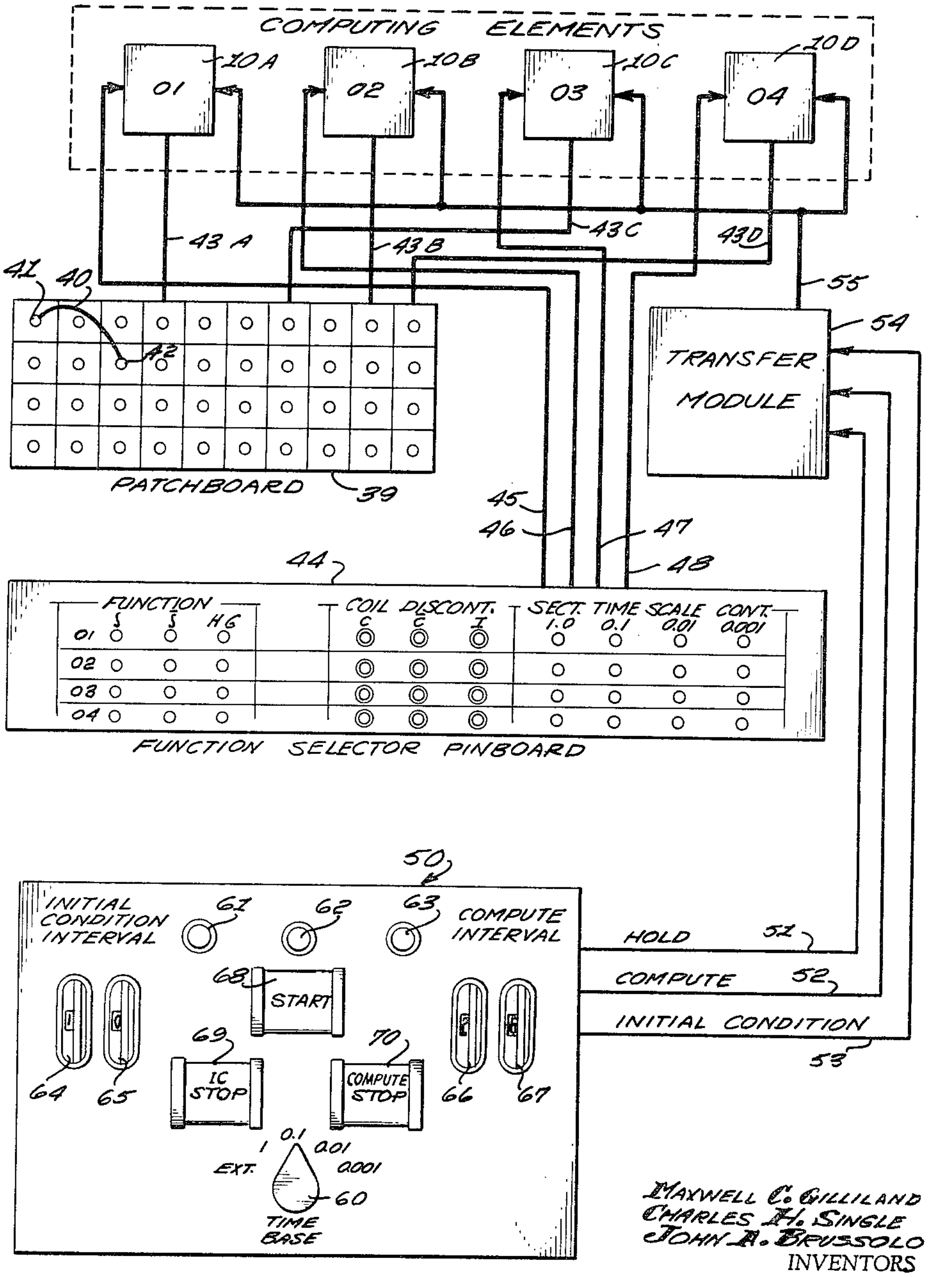
FIG. 1 is a block diagram of an iterative analog computer constructed in accordance with the present invention.

Referring now to FIG. 1, there is shown in block diagram form an iterative analog computer comprising, by way of example only, the 01 element 10A, the 02 element 10B, the 03 element 10C, and the 04 element 10D. It will be understood that the number of analog computing elements required in a computer system is determined by the number of integrators (and as described below, complementary integrators), their number, in turn, varying according to the complexity and types of problems encountered.

A simplified schematic of a computing element 10 is shown in FIG. 2 for illustrating the respective functions of integrators and complementary integrators and includes an amplifier 11, preferably a precision ultra-linear high gain amplifier, having a feed back capacitor 12 connected between its input 13 and its output terminal 14. The input signal $e_{in}$ to be integrated is connected to integrator input terminal 15 and hence to the input 13 of amplifier 11 via input resistor 16 and normally open C relay contacts 17, 18. The end of input resistor 16 away from input terminal 15 is also connected to ground via normally open $\overline{C}$ relay contacts 19, 20. Initial condition input terminal 25 is connected to the input 13 of amplifier 11 via input resistor 26 and normally open I relay contacts 27, 28. Feedback resistor 29 is also connected between the input and output of amplifier 11 by contacts 27, 28. Control coils 30, 31, and 32 of the respective C, $\overline{C}$, and I relays are each connected to a source of power represented by battery 33 and to a relay control unit 34.

As described in further detail below, the computing element shown in FIG. 2 is adapted to function both as a normal and as a complementary integrator depending upon the predetermined duty cycle of the C, $\overline{C}$, and I relays. A normal integrator ($\int$) is defined herein as one which tracks the signal at its Initial Condition input terminal during the INITIAL CONDITION interval, holds or memorizes this initial condition signal during the succeeding HOLD interval, and integrates the signal at its integrate input terminal during the COMPUTE interval using the tracked and held signal as its initial condition. A complementary integrator ($\overline{\int}$) is defined herein as one which integrates the signal appearing at its integrate input terminal during the INITIAL CONDITION interval, tracks the signal at its initial condition terminal during the COMPUTE interval, and holds or memorizes the tracked voltage during the succeeding HOLD interval. These respective functions are graphically illustrated in FIG. 3. As shown therein, the respective HOLD intervals for each coincide whereas, with the exception of the very first cycle, the INITIAL CONDITION and COMPUTE intervals are respectively opposite. In the INITIAL CONDITION interval of the first cycle the normal integrator is in its INITIAL CONDITION mode whereas the complementary integrator is in its HOLD interval. This operation is provided since if the complementary integrator were than placed in its COMPUTE mode, the initial conditions established for the normal integrators could cause the complementary integrators to overload.

The operation of the computing element of FIG. 2 for achieving the integrator and complementary integrator functional modes is as follows: In the normal integrator operation, the initial condition signal $e_{i.c.}$, if any, at the initial condition input terminal 25 is to be tracked and stored by the capacitor 12 during the INITIAL CONDITION interval. Thus, the relay control 34 grounds the $\overline{C}$ and I relays, thereby driving them from battery 33. The signal voltage $e_{in}$ at input terminal 15 is then grounded through input resistor 16 whereas capacitor 12 is charged to the negative value of the initial condition signal $e_{i.c.}$ imposed on the initial condition input terminal 25. The iterative operation relay duty cycle is illustrated for a complete sequence for both normal and complementary integrators in FIG. 4. As shown therein, following the INITIAL CONDITION interval is a HOLD interval in which the initial condition signal $e_{i.c.}$ is retained by charged capacitor 12. In order to prevent appreciable discharge of capacitor 12 during the HOLD interval, all inputs are removed from the amplifier 11; accordingly only relay $\overline{C}$ is actuated during each hold period. Immediately following the HOLD interval is a COMPUTE interval during which time the signal at input terminal 15 is integrated; thus, only relay C is then actuated with the result that the integrated value of the voltage at input terminal 15 from the appropriate initial condition is available as the voltage $e_{out}$ on output terminal 14. Following the COMPUTE period, another HOLD interval is provided by grounding relay C.

The operation of the computing element for the complementary integrator mode of operation is also illustrated in FIG. 4 wherein is shown that during the INITIAL CONDITION interval of the first cycle, only relay $\overline{C}$ is actuated thus achieving the desired HOLD mode. The following HOLD interval is provided by grounding relay $\overline{C}$ only. The INITIAL CONDITION mode during the succeeding COMPUTE interval is produced by grounding both relays $\overline{C}$ and I. The voltage $e_{i.c.}$ is then tracked and held during the following HOLD interval. The complementary integrator is then placed in a COMPUTE mode during the succeeding INITIAL CONDITION interval by actuating relay C. For purposes of defining the machine control operational intervals, the INITIAL CONDITION and COMPUTE modes are based upon the normal integrator mode conditions.

The HOLD interval shown in FIGS. 3 and 4 is provided after each INITIAL CONDITION and COMPUTE interval so as to allow sufficient time for information transfer between interconnected normal and complementary integrator computing elements and also to avoid relay tracking difficulties. The HOLD interval is normally chosen to be at least ten times the time constant of the integrator in the INITIAL CONDITION mode so as to compensate, if necessary, for the delay in storing the signal applied to the initial condition input 25.

Referring again to FIG. 1, several input and output terminals of each of the analog computing elements 10A–10D are interconnected to other like computing elements or to other analog computer components such as multipliers, dividers, resolvers, function generators, etcetera, by patchboard 39. Such patchboards are well known in the art and are used, for example, in the Models 1132, 1133, 2132, and 2133 Analog Computers constructed by Beckman Instruments, Inc., assignee of the present invention. Each computing component is terminated at a respective contact spring of the patchboard which in turn, meets with inserted patchcords for the particular program wiring. By way of example, a patchcord 40 is shown inserted in contact spring 41 and contact spring 42 of patchboard 39. The connecting lines 43A, 43B, 43C, and 43D shown connecting each of the computing elements to the patchboard will be understood to each represent a plurality of electrical conductors since each of the computing elements includes several input terminals and an output terminal.

A function selector pinboard 44 including a plurality of make and break electrical contacts connected to the computing elements by respective conducting lines 45, 46, 47, and 48, each of which represents plurality of conductor leads. This pinboard is divided into three major columns respectively labeled "Function," "Coil Disconnect," and "Sector Time Scale Control." Each row of the function selector pinboard is associated with a particular one of the computing elements 10A, 10B, 10C, and 10D; therefore, these rows are labeled 01, 02, 03, and 04 as are the respective computing elements shown in FIG. 1. As described with reference to FIG. 5 below, suitable pins inserted under the "Function" column at the row associated with the pertinent computing element enables the preselection of the normal integrator (∫) function, complementary integrator $\overline{(\int)}$ function, or a high-gain amplifier (HG) function for a specific computing element. If no pin is inserted, the computer element functions as a summer amplifier. Pins inserted in the "Coil Disconnect" column permit the operator to disconnect a pertinent operational amplifier from the automatic iterative control hereinafter described. Pin inserted in the column labeled "Sector Time Scale Control" enables the operator to override the automatic feedback capacitor selector control. Each of these functions will be described in more detail below.

The iterative analog computer shown in FIG. 1 further includes an iterative control unit 50 which generates on three output lines 51, 52, and 53, respectively labeled "Hold," "Compute," and "Initial Condition," sequential signals for driving the computing elements 10A–10D through the iteration sequence. Normally, additional signals are required for driving the several relay switching elements in each of the computing elements so that a transfer module 54 is connected to the output leads of the iterative control and connected to each of the computing elements by connecting line 55, this latter line representing a plurality of leads.

The front panel of the iterative control unit 50 includes a time base selector switch 60 for selecting internally generated time base periods of 0.001, 0.01, 0.1 and 1 second and also a fifth position for connecting an externally connected time base generator if desired. Three indicator lamps 61, 62, and 63 respectively indicate the "Initial Condition," "Hold," and "Compute" mode intervals. A pair of decimal digital selector dial switches 64 and 65 permit the INITIAL CONDITION time interval to be extended to an integral multiple of the time base (ranging from 1 to 99). Likewise the decimal digit selector dial switches 66 and 67 permit the COMPUTE interval to be extended to an integral multiple of the time base (also ranging from 1 to 99). The start button 68, when actuated, starts the iterative control unit functioning. The pushbutton 69 labeled "Initial Condition Stop" functions, when actuated, to stop the iterative control unit 50 at the end of the succeeding INITIAL CONDITION interval. Likewise, the pushbutton labeled "Compute Stop," when actuated, stops the iterative control unit at the end of the next COMPUTE interval.

Figure 5:
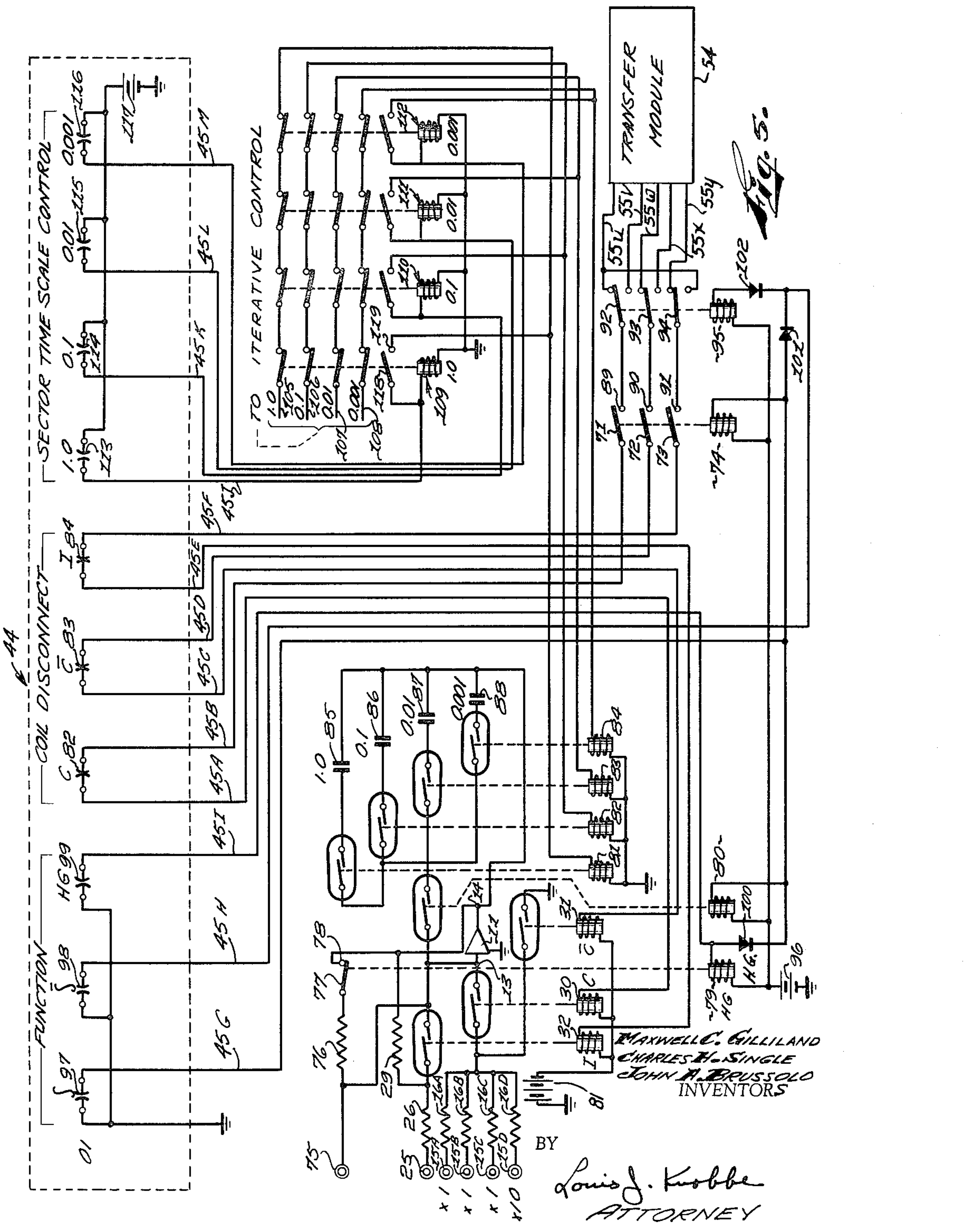
FIG. 5 is a complete circuit schematic of an analog computing element and a portion of the function selector pinboard constructed in accordance with this invention.

A more detailed illustration of a computing element constructed in accordance with the present invention is shown in FIG. 5. Those elements identical with those shown in FIG. 2 bear the same numerals. Thus, amplifier 11 has an input terminal 13 connected to one terminal of the C relay. The other terminal of this relay is connected to a plurality of input terminals 15A, 15B, 15C, and 15D via respective input resistors 16A, 16B, 16C, and 16D. As shown, terminals 15A through 15C are labeled X1 whereas terminal 15D is labeled X10, the particular multiplication factor being determined by the size of the input resistor (16D being one-tenth the value of 16A, 16B, or 16C) thus affording a convenient means of scaling the input signal connected to the computing element. The amplifier input terminal 13 is also connected to one terminal of the I relay, the other terminal of which is connected to the initial condition input terminal 25 via input resistor 26. The latter terminal of the I relay is also connected to the output 14 of amplifier 11 via feedback resistor 29. The $\overline{C}$ relay connects each of the signal inputs 15A–D and input resistors 16A–D to ground through its normally open contacts. A summing amplifier input 75 is connected to the amplifier input 13 and to feedback resistor 76 connected between the input 13 and output 14 of the amplifier 11 via normally closed contacts 77, 78 of the high-gain (HG) relay 79. A capacitor selector unit comprising main control relay 80 and relay 81, 82, 83, and 84 in combination with capacitors 85, 86, 87, and 88 allows the feedback capacitor to be automatically or manually selected as described hereinafter. As shown in the figure the C, $\overline{C}$ and I as well as relays 80–84 preferably include dry reed contacts since their faster operating speeds permit an accordingly shorter iterative cycle. For still higher iteration rates, solid state switches may be employed.

A power source shown as negative bias battery 81 is connected to one terminal of each of the relay coils 32, 30, and 31 of the I, C and $\overline{C}$ relays, respectively. The other terminals of these relay coils are respectively connected in series with normally closed contacts 82, 83, and 84 of the function selector pinboard 44 via conductors 45A–45F and movable contacts 71, 72, and 73 of relay 74. Stationary contacts 89, 90, and 91 of this relay are connected to movable contacts 92, 93, and 94 of relay 95. Stationary contacts of relay 95 are connected to five input control lines 55U, 55V, 55W, 55X, and 55Y which are driven by the iterative control unit 50 via the transfer module 54, described in detail below.

The control coils of the HG relay 79 and relays 80, 74, and 95 are each connected to a power source designated as positively poled battery 96 and to ground via conductors 45G, 45H, 45I and normally open contacts 97, 98, and 99 of the function selector pinboard 44. As described hereinafter, diodes 100, 101, and 102 provide the requisite energizing of these relay coils for achieving the desired functional operating modes in accordance with the pin inserted in pinboard 44.

Further details and the operation of the portion of the computing element of FIG. 5 described hereinabove are as follows: Without any pins in the function selector pinboard for the specific analog computer component shown, none of the coils of relays 79, 80, 74, and 95 are connected to ground; accordingly, feedback resistor 76 is connected between the input 13 and the output 14 of the amplifier 11 so that signals connected to summing input 75 may be summed by the amplifier connected as a summing amplifier. It will be noted that in this condition, the iterative control signals appearing on input leads 55U to 55Y have no effect on the operation of the computing element because of the open contacts of non-actuated relay 74.

If a pin is inserted in the high gain (HG) input of the function selector pinboard, the normally open contacts 99 are closed thus grounding the coil of high gain relay 79. This relay is then actuated thereby disconnecting feedback resistor 76 from the output 14 of amplifier 11. None of the other relay coils are actuated since the grounding of the anode of diode 100 reverse biases this diode. In this condition, the computing element 10 serves as a high gain amplifier for signals connected to input terminals 15A–15D.

It will be noted that in this condition also, the iterative control signals have no effect on the operational computing element because of the open contacts of non-actuated relay 74.

When a pin is inserted in the normal integrator (∫) input of the function selector pinboard, the normally open contacts 97 are closed thus grounding the coils of relays 80 and 74 and the cathode of diode 100. Accordingly, relay 79 (through forwardly biased diode 100) and relays 80 and 74 are actuated. Reversed biased diode 101 prevents actuation of the relay 95. Accordingly, the group of feedback capacitors 85, 86, 87, and 88 are conditioned for use between the input and output of the amplifier 11 by the closing of the relay 80 contacts. Also, the closing of the relay 74 contacts cause the I, C and $\overline{C}$ relays to be selectively actuated by the iterative control signals appearing on input leads 55U–55Y.

The analog computer element shown in FIG. 5 automatically serves as a complementary integrator by inserting a pin into the complementary integrator $\overline{(\int)}$ input of the function selector pinboard thereby closing contacts 98 and grounding the cathodes of diodes 101 and 102. Since these diodes are then forwardly biased, the coils of relays 80, 74, and 95 are energized and the cathode of diode 100 is grounded thus also energizing the HG relay 79. Relay 95 thus determines whether the computing element is to function as an integrator or as a complementary integrator.

Figure 6:
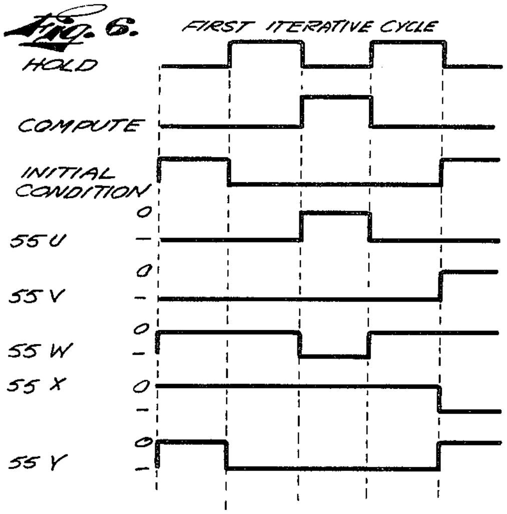
FIG. 6 illustrates the input signals applied to the analog computing element of FIG. 5.

FIG. 6 illustrates the required signals on input lines 55U, 55V, 55W, 55X, and 55Y for appropriately driving the I, C, and $\overline{C}$ relays during the HOLD, COMPUTE, and INITIAL CONDITION intervals. Assuming that relay 95 is non-actuated, i.e., that the integrate function has been preselected at the pinboard 44, in the INITIAL CONDITION interval of the first cycle, lines 55W, 55X, and 55Y are grounded. Accordingly, the $\overline{C}$ and I relays are properly actuated (refer to FIG. 4) by the ground potential signals on the 55W and 55Y leads (the grounding of 55X has no effect since it is connected to an open terminal of relay 95). In the succeeding HOLD interval, leads 55W and 55X are grounded, the ground on lead 55W actuating the $\overline{C}$ relay. That this is the appropriate relay actuation may be determined by referring again to FIG. 4. In the COMPUTE interval, leads 55U and 55X are grounded. The ground on lead 55U causes the C relay only to actuate as required by the duty cycle shown in FIG. 4. The following HOLD interval is identical to the previous HOLD interval. Following this HOLD interval, there is another INITIAL CONDITION interval provided by grounding leads 55V, 55W, and 55Y. While the computer element functions in the normal integrate mode, the 55V lead is connected to an open contact of relay 95. However, the 55W and 55Y leads cause the $\overline{C}$ and I relays respectively to be actuated per the duty cycle shown in FIG. 4.

Consider now the operation of a complementary integrator. In the first cycle INITIAL CONDITION interval, the 55W, 55X, and 55Y leads are grounded. Because of the actuation of relay 95 for the complementary integrator mode of operation, leads 55W and 55Y are connected to open contacts of this relay. Grounding of lead 55X, however, causes the $\overline{C}$ and only the $\overline{C}$ relay to actuate as specified by the duty cycle shown in FIG. 4. In the succeeding HOLD interval, the 55W and 55X leads only are grounded so that only the $\overline{C}$ relay remains actuated. The COMPUTE interval follows this hold period; the 55U and 55X leads are accordingly grounded. The $\overline{C}$ is then grounded by the 55X lead and the I relay is grounded by the 55U lead thus actuating these relays per the duty cycle shown in FIG. 4. The following HOLD interval is identical to the preceding HOLD interval. Following the second HOLD interval, there is another INITIAL CONDITION interval in which the 55V, 55W, and 55Y leads are grounded thus actuating the C and only the C relay per the duty cycle of FIG. 4.

The feedback capacitor selector system comprises relays 81, 82, 83, and 84 each having respective normally open contacts connected in series with respective weighted capacitors 85, 86, 87, and 88 having preselected values corresponding to the time bases 1.0, 0.1, 0.01, and 0.001 labeled in FIG. 5. The relay coils of respective relays 81, 82, 83, and 84 are connected directly to ground and to respective input leads 105, 106, 107, and 108 via normally closed contacts of each of the automatic control override relays 109, 110, 111, and 112. Also, these relay coils are connected by lines 45J, 45K, 45L, and 45M to respective normally open contacts 113, 114, 115, and 116 of the pinboard 44. Assuming that none of the automatic control override relays are actuated, the actuation of any capacitor selector relay depends upon which of the leads 105–108 is connected to a power source. As described hereinafter, the iterative control unit automatically applies the appropriate control voltage to the respective lead for selecting the appropriate capacitor according to the time base selected by time base selector switch 60 (FIG. 1).

Automatic control override relays 109, 110, 111, and 112 override the automatic control provided by the iterative control unit. Thus, if the "1.0 time base" capacitor is desired for computer element 01 regardless of the time base selected at the iterative control unit, a pin is inserted in the function selector pinboard 44 in the 1.0 input under the Sector Time Scale Control. This causes the contacts 113 to close thus connecting the power source represented by battery 117 to the automatic control override relay 109 and actuating same thus disconnecting input leads 105–108 from the capacitor selector relays 81–84. However, the capacitor selector relay 81 which actuates the capacitor 85 corresponding to the 1.0 time period is then connected to power source 117 via the then closed contacts 118, 119, of override relay 109. In a similar fashion, any of the other capacitors 86 through 88 may be selected regardless of the time base selected by inserting a pin in the appropriate input of the function selector pinboard thereby actuating the appropriate automatic control override relay.

Preferred circuitry for the iterative control unit 50 is shown in FIGS. 7*a* and 7*b*. The time base generator 125 illustrated in FIG. 7*b* supplies a series of pulses having a predetermined repetition rate and comprises local oscillator 126, a pulse shaper 127 connected to the output of the oscillator, and three series connected decade frequency dividers 128, 129, and 130. Oscillator 126 preferably comprises a crystal-controlled oscillator capable of generating an alternating current signal whose period is no longer than the maximum time width of the desired HOLD interval. For the specific time base intervals shown of 0.001, 0.01, 0.1 and 1.0 seconds, oscillator 126 will be set to operate at a frequency of 1000 c.p.s. It will be understood that the highest frequency usable is normally determined by the circuitry within each computer element 10. The current state of the art permits an iteration frequency as high as 25K c.p.s. The output of the pulse shaper 127 and each of the decade dividers is connected to a respective one of the contacts 131A, 132A, 133A, and 134A of a multi-contact rotary selector switch 135. A final contact 136A is connected to "external" terminal 137 which may be connected to a source of clock pulses external to the iterative control unit. Rotatable contact 138A of the rotary switch is in continuous slip-ring contact with the time base generator output terminal 139 via one shot multivibrator 140. This multivibrator provides pulses with uniform width at its output and has no effect on the repetition frequency of the signals provided by the preceding circuitry. Representative signals at the output of the pulse shaper and the one shot multivibrator are shown in FIG. 8.

Multi contact rotary selector switch 135 further includes an additional movable contact 138B and fixed contacts 131B, 132B, 133B, and 134B, respectively connected to leads 108, 107, 106, and 105 which are in turn connected to the automatic capacitor control system included in each computer element as shown in FIG. 5. Movable contact 138B makes slip-ring contact with a source of power represented by battery 145 connected to ground. The movable contacts 138A and 138B of the rotary selector switch are ganged and connected to front panel control 60 of the iterative control unit (FIG. 1).

The complete operation of the automatic capacitor selection system will now become apparent. Thus, assuming that a time base of 0.1 second has been preselected by rotating the front panel control to the appropriate position, the power source 145 will be connected through movable contact 138B, fixed contact 133B, conductor 106, closed contacts of relays 109, 110, 111, and 112 (FIG. 5) to the relay coil of relay 82 thereby connecting the preselected feedback capacitor 86 between the input and output of amplifier 11. In like manner, each and every one of the analog computer elements constructed in the manner of FIG. 5 will be so actuated with the exception of those in which the automatic control has been overridden by the insertion of a pin in the Sector Time Scale Control of the function selector pinboard 44 as hereinabove described.

Referring to FIG. 7*a*, the output of the one shot multivibrator 140 (FIG. 7*b*) is operatively connected to an input of AND gate 150. In the following discussion, it will be assumed that an AND gate transmits a pulse between its input and its output if, and only if, simultaneous binary "1" pulses are applied to the other inputs of the AND gate. Also, "inhibit" gates provide binary "0" signals at their outputs if, and only if, simultaneous binary "0" signals are applied to their inputs. In FIG. 1, a positive going or ground potential signal is assumed to be a binary "1" pulse and a negative signal is assumed to be a binary "0" pulse. Assuming that AND gate 150 is not inhibited, i.e., it is open to pass a pulse between its input and output, an output pulse will be applied to the input of AND gate 151 via amplifier 152. AND gate 151 is also operatively connected to the INITIAL CONDITION output terminal 53. Initially, let it be assumed that the system is generating the INITIAL CONDITION control signal shown in FIG. 8 so that a binary "1" pulse will be applied to the output of AND gate 151 upon occurrence of the first clock pulse. (AND gates 160 and 161 are then closed by the binary "0" negative voltage received from the HOLD output 51 and COMPUTE output 52). This binary "1" output pulse is shaped by pulse shaper 155 before being applied to the trigger input of preset counter 156. (Pulse shaper 155 insures that the preset counter is properly driven). Preferably, this counter is provided with one or more decade switches for presetting a predetermined count which the counter must reach before applying a binary "1" signal to its output 157. Such preset counters are known in the art and have been sold, for example, by the Berkeley Division of Beckman Instruments, Inc., as the model 7410 and 7420 Preset Counters. INITIAL CONDITION preset control switches 64, 65 correspond to the like numbered rotatable selector switches shown in FIG. 1 on the control panel of the iterative control unit 50. These switches allow the preselection of any count from 0 to 99 which must be reached before a pulse appears at output 157. Accordingly, AND gate 151 will continue to apply pulses at its output which correspond in time to the clock pulses so long as the ground INITIAL CONDITION control signal is applied to the INITIAL CONDITION output terminal 53. These pulses will be counted by the counter until such time as the preset count is reached when an output pulse is applied to the input of OR gate 158 via amplifier 159. OR gate 158 passes this binary "1" pulse to a pulse shaper 170 which in turn in connected to the input of a multi-state device 171. By way of illustration, assume that the switches 64, 65 are preset to the respective numbers of "0" and "1." The counter then counts the first clock pulse 154 and then applies an output pulse upon receipt of the second clock pulse 158 (FIG. 8).

Multi-state device 171 comprises a pair of bi-stable flip-flop stages 172 and 173 each having respective trigger input terminals 174 and 175, respective reset terminals 176 and 177 and respective output terminal pairs 178, 179 and 180, 181. Flip-flops 172 and 173 may be constructed in any of the numerous ways presently known in the art. A representative circuit, for example, incorporates a pair of transistors so cross-coupled that the transistors are retained in mutually exclusive states of conduction and non-conduction. The table below describes the relationship between the interative control output signals and the four stable states provided by the multi-state device 171.

| Mode | Flip-flop 172 | Flip-flop 173 |
|---|---|---|
| Initial condition | 0 | 0 |
| Hold | 1 | 0 |
| Compute | 0 | 1 |
| Hold | 1 | 1 |
| Initial condition | 0 | 0 |

In the foregoing table, a "0" for flip-flop 172 represents a binary "1" signal on output 178 and a binary "0" signal on output 179. Likewise, a "0" for flip-flop 173 represents a binary "1" signal on output 180 and a binary "0" signal on output 181. Thus, for the assumed INITIAL CONDITION output control signal, binary "1" signals are applied at output terminals 178 and 180 and binary "0" signals are applied to output terminals 179 and 181. Accordingly, binary "1" signals are applied to both input terminals of AND gate 185 through respective buffer stages 186 and 187, the other AND gates 188 and 189 having at least one input connected to a binary "0" terminal. The output of each of the AND gates 188, 185, and 189 are connected to respective driver stages 190, 191, and 192 which supply the desired control signals to the output terminals 52, 53, and 51. Since AND gate 185 is the only one which passes a binary "1" signal to the input of its connected driver stage, only the INITIAL CONDITION output terminal 53 has applied thereto a binary "1" ground potential.

Upon receipt at the trigger input 174 of binary flip-flop stage 172 of the binary "1" signal which originated at the output 157 of the preset counter 156, the flip-flop is triggered to its respectively opposite state as shown in the table above whereupon binary "1" signals are applied to terminals 179 and 180 of the multi-state device and binary "0" signals are applied to the output terminals 178 and 181 thereof. Because of the interconnections between these output terminals and the three AND gates 188, 185, and 189 via the buffer stages 186, 187, 193, and 194, only AND gate 189 is supplied with a binary "1" signal. This gate causes driver stage 192 to supply a HOLD control signal to output terminal 51. Thus, the clock pulse 158 which resulted in the application of an output signal to the output of preset counter 156 also initiates the HOLD control signal (see FIG. 8).

The next clock pulse 200 appearing in timed sequence is applied to the input of AND gate 160 which is also operatively connected to the HOLD output terminal 51. Since this AND gate and only this gate (AND gates 151 and 161 are then closed) has at this time simultaneous binary "1" pulses applied thereto, the gate is opened and a binary "1" signal applied to the input of OR gate 158 via amplifier 201. The output pulse from this amplifier is applied to the trigger input 174 of the multi-state device 171 via the pulse shaper 170. The multi-state device then changes to its third stable state as shown in the table above, wherein binary "1" signals are supplied to output terminals 178 and 181. Accordingly, AND gate 188 then opens and applies a binary "1" signal to driver 190 to supply a COMPUTE control signal to output terminal 52. Thus, the period of the clock pulse repetition rate determines the time-width of the HOLD control signal (see FIG. 8); likewise, the last clock pulse 200 initiated the COMPUTE control signal.

Following clock pulse 200, succeeding clock pulses are transmitted through AND gate 161 which is operatively connected to the COMPUTE control output terminal 53. The output of AND gate 161 is connected to the input of preset counter 205 via pulse shaper 206. This preset counter may be identical in construction to that of preset counter 156, described hereinabove. The control switches 66 and 67 of this preset counter are available at the iterative control output panel shown in FIG. 1 and labeled "COMPUTE INTERVAL." By way of example only, it will be assumed that the counts of "0" and "2" are preset in the selector switches 66 and 67 so that two clock pulses are required at the input of counter 205 before a clock pulse results in the application of an output pulse to the input of OR gate 158 via amplifier 207. This operation is illustrated in FIG. 8. The multistate device 171 is then triggered into its fourth stable state wherein binary "1" signals are supplied at the outputs 179 and 181, thereby causing AND gate 189 and driver stage 192 to supply a ground potential signal to the HOLD control output terminal 51. Thus, the clock pulse 208 which actuated the preset counter 205 also defines the end of the COMPUTE interval and the start of the second HOLD interval.

The next occurring clock pulse 209 is gated through AND gate 160 to the trigger input of the multi-state device 171 via amplifier 201, OR gate 158 and pulse shaper 170 so as to trigger this device into its first stable state thus initiating another INITIAL CONDITION interval. It may be noted that the system is then in the same state as was originally assumed for the first clock pulse 154. The system thus continues to operate to produce the sequentially occuring INITIAL CONDITION, HOLD, COMPUTE and HOLD control signals.

Certain auxiliary features of the system shown in FIG. 7*a* will now be described: Lamps 61, 62, and 63 which are mounted on the face of the iterative control panel shown in FIG. 1 are connected to outputs 53, 51 and 52 respectively and serve to indicate in which mode the iterative control is then operating.

The start control button 68 (FIGS. 1 and 7*a*) is adapted, when actuated, to ground conductor 215 and the trigger input of flip-flop 216. Flip-flop 216 then applies a binary "1" signal to the input of AND gate 150 thereby opening this gate for succeeding clock pulses if inhibiting binary "0" signals are not being received from either of the inhibit gates 217, 218. In the foregoing description, it has been assumed that flip-flop 216 and inhibit gates 217, 218 each applied binary "1" signals to the input of AND gate 150.

The output of flip-flop 216 serves still another purpose in that it resets each of the flip-flops 172, 173, of the multi-state device 171 to their respective binary "0" states. Thus, each time the start button 68 is actuated, the iterative control unit is reset to start in the INITIAL CONDITION mode.

The stop control buttons 69 and 70 shown on the iterative control panel of FIG. 1 are connected to respective inhibit gates 217 and 218 shown in the system of FIG. 7*a*. The function of stop button 69 is to enable, upon actuation thereof, the interruption of an iterative control cycle at the end of the succeeding INITIAL CONDITION mode. Likewise, the push-button 70 is provided to interrupt, when actuated, the iterative control cycle at the end of the succeeding COMPUTE mode. The circuitry and operation of the stop controls is as follows: Push-button 69 serves to complete a circuit between a source 219 of negative or binary "0" potential and an input of inhibit gate 217. Inhibit gate 217 is also operatively connected to the outputs 178 and 181 of multi-state device 171. Referring now to the table above, it will be seen that simultaneous binary "0" signals will be supplied inhibit gate 217 by the multi-state device 171 when it is in its second stable state (during the first HOLD interval). Thus, if the push-button 69 is actuated, inhibit gate 217 will supply an inhibit signal or binary "0" signal to the input of AND gate 150 so as to prevent the next occurring clock pulse 200 from terminating the first HOLD interval. In similar manner, the COMPUTE stop includes inhibit gate 218 which is connected to the source 219 of negative potential by push-button 70 and which also is responsively connected to the multi-state device outputs 178 and 180. Referring to the table above, it may be noted that binary "0" signals are supplied at the outputs of these stages during the second HOLD interval. Thus, the next succeeding clock pulse 209, as illustrated in FIG. 8, is prevented from terminating the second HOLD interval.

Actuation of either the INITIAL CONDITION stop button 69 or the COMPUTE stop button 70 also applies a pulse to the input of OR gate 220 which is connected to the reset input of flip-flop 216. The iterative control is then ready for the reactuation of the start control button 68. It will be apparent that the connection between OR gate 220 and flip-flop 216 may be broken by a suitable switch (not shown) if it is desired that the computer continue the previously interrupted sequence.

Initiation of the first HOLD control interval also serves to supply simultaneous binary "1" signals to the input of AND gate 221 from outputs 179, 180 of the multi-state device 171 so as to provide a reset signal to the input of preset counter 156. This counter is thus always reset at the end of the INITIAL CONDITION period so as to be in condition for re-establishing the desired INITIAL CONDITION after the second HOLD control interval. Likewise, the initiation of the second HOLD control interval applies binary "1" signals from outputs 179, 181 of the multi-state device 171 to the inputs of AND gate 222 so as to reset preset counter 205. This counter is thus always reset at the end of the COMPUTE interval so as to be in condition for re-establishing the desired COMPUTE control interval after the first HOLD control interval.

The transfer module 224 shown in FIG. 9 has the function of converting the HOLD, INITIAL CONDITION, and COMPUTE control signals on respective leads 51, 53, and 52 into appropriate control voltages on the input leads 55U, 55V, 55W, 55X, and 55Y which are connected to each analog computer element, i.e., the transfer module provides the control signals shown in FIG. 6. This unit comprises a series of buffer diodes 225, 226, 227, 228, 229, and 230 and driver amplifiers 231, 232, 233, and 234. The cathodes of each of the buffer diodes are connected to a negative source of potential 235 vie respective bias resistors 240, 241, 242, and 243. Thus, the ground potential HOLD, INITIAL CONDITION, or COMPUTE control signals will forwardly bias these diodes thereby causing the driver amplifiers to provide grounded outputs on one or more of the respective leads 55U–55Y. Transfer module 224 further includes relay 244 having a pair of movable contacts 245 and 246 respectively connected to the 55X and 55V leads. This relay, in conjunction with flip-flop 247 and the start control button 68 of the iterative control unit (FIGS. 1 and 7*a*) provides the modified control signals required in the first cycle as shown in FIG. 6.

The operation of the transfer module is as follows: Assume that the start button 68 of the iterative control unit has just been actuated. Lead 215 is then grounded thereby triggering flip-flop 247 which grounds relay 244 so as to actuate same from battery 248. The first INITIAL CONDITION control signal appearing on lead 53 from the iterative control unit causes both amplifiers 232 and 234 to provide grounded outputs thus grounding leads 55W, 55Y, and 55X via the then closed contacts 245, 249 of relay 244. Referring to FIG. 6, it will be seen that the appropriate drive signals have thus been applied to these leads. The succeeding HOLD control signal on lead 51, also a ground level signal, causes driver amplifiers 232 and 233 to ground their outputs thereby grounding lead 55W. The signal at the output of driver amplifier 233 is also connected to the reset input of flip-flop 247. This stage then resets to its opposite state and disconnects relay 244 from ground thereby deactuating same. The 55X lead is then also connected to the grounded output of driver amplifier 233 per FIG. 6. In the succeeding COMPUTE interval in which lead 52 is grounded, driver amplifiers 231 and 233 are driven ON via buffer diodes 225 and 229 so as to ground their respective outputs connected to the 55U and 55X leads, per FIG. 6. The HOLD interval after the COMPUTE interval is identical to that of the previous HOLD interval. The following INITIAL CONDITION interval again causes driver amplifiers 232 and 234 to ground their respective outputs thereby grounding leads 55W and 55Y and lead 55V via the then closed contacts 245, 250 of relay 244, as specified by FIG. 6.

As previously noted, analog computer elements constructed in accordance with this invention may be interconnected in a myriad of arrangements, both with like analog computer elements and also those customarily used in the analog computer field, i.e., function generators and resolver systems. Therefore, the representative interconnection of four computer elements constructed in accordance with this invention which is shown in FIG. 10 is by way of example only for purposes of better illustrating the advantages of the present invention. Shown in FIG. 10 is a group of four analog computer elements 10A, 10B, 10C, and 10D respectively operating as a normal integrator, complementary integrator, a normal integrator and a summer.

The contacts only of relays 74 and 95 are shown in FIG. 4 for simplicity of illustration. For example, in normal integrator 10A, relay contacts 71A, 72A, and 73A engage contacts 89A, 90A, and 91A. Relay 95A is not actuated so that the upper fixed contacts are engaged by respective movable contacts 92A, 93A, and 94A.

The first normal integrator 10A has a pair of inputs of which 260 represents the integrator input and 261 represents the initial condition input. The output 262 of this computer element is connected by a patch cord 263 at the patch board 39 (FIG. 1) to the initial condition input 264 of the complementary integrator 10B and via another patch cord 265 and resistor 266 to the summer input 267 of summer 10D.

The output 268 of the complementary integrator is connected to the initial condition input 269 of the second normal integrator 10C. The integrate input 270 of integrator 10C is connected to the output 275 of summer 10D via patch cord 274. The output 276 of the second normal integrator 10C is connected via patch cord 277 to the integrate input 278 of the complementary integrator 10B and input 267 of summer 10D via summing resistor 279. Since the summing computing element is being used as such, the integrate and initial condition terminals are unconnected since this portion of the circuitry is out of circuit with the amplifier 11D.

The operation of the interconnected system of FIG. 10 is as follows: data computed by integrator 10A is tracked by the complementary integrator 10B during the COMPUTE interval, held by the complementary integrator during the HOLD interval, and then used by the complementary integrator during the INITIAL CONDITION interval as its initial conditions (since the complementary integrator computes during the INITIAL CONDITION interval). In a similar manner, the data computed by the complementary integrator 10B is tracked by the second normal integrator 10C during the INITIAL CONDITION interval, held during the following HOLD interval, and then used as its initial conditions during the succeeding COMPUTE interval. It will thus be seen that a computation may be carried out which is described by two different sets of equations where the initial conditions for each depend on previously computed data from the other.

The present invention thus comprises an analog computer having at least one but in most instances a plurality of multi-function computing elements each under the control of an iterative control unit generating precisely timed intervals of INITIAL CONDITION, HOLD, COMPUTE, and HOLD. Those computer elements functioning as normal integrators track signals at their initial condition inputs during the INITIAL CONDITION interval, hold the tracked signal during the following HOLD interval and then use this held signal as its initial condition during the succeeding COMPUTE interval. As distinguished therefrom, those elements functioning as complementary integrators integrate signals at their integrate input during the INITIAL CONDITION interval (except for the first cycle INITIAL CONDITION as described above), and track signals at their INITIAL CONDITION input during the COMPUTE interval.

Each of the multi-functional analog computer elements preferably includes a plurality of weighted feedback capacitors which are automatically connected between the input and output of the amplifier according to the time base selected for the iterative cycle.

Another important feature of the invention described above is the inclusion of a function selector pinboard by which the mere insertion of a pin selects the desired function, i.e., a summer if no pin is selected whereas a normal integrator, a complementary integrator, or a high gain amplifier may be preselected by inserting a pin in the corresponding position of the pinboard. Likewise, the mode selector relays of each computer element may be disconnected at the pinboard. Also, the automatic capacitor selector system may be overridden at the pinboard so that a desired feedback capacitor may be preselected regardless of which time base is set at the iterative control unit.

Still another important feature of the invention is the inclusion of a precise decimal digit control over both the COMPUTE and INITIAL CONDITION time intervals thus providing a quick and accurate preselection for these time intervals.

Each of the foregoing features contributes to a very fast repetitive type of iterative analog computer capable of performing with ease such previously difficult problems as partial differential equations, statistical problems, and others hereinabove noted.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. An iterative analog computer comprising:

a plurality of computing elements having respective integrate and initial condition input terminals, each of said computing elements being operable under external control to function in respective normal integrator and complementary integrator modes;

a function selector pinboard having a plurality of electrical contacts adapted for actuation by pins inserted in said pinboard;

means connecting each of said computing elements to predetermined electrical contacts of said pinboard so that the mode of operation of said computing elements may be preselected by inserting pins in said pinboard;

patchboard means connected to each of said computing elements for interconnecting said elements in a predetermined relationship;

iterative control means for sequenially generating INITIAL CONDITION, HOLD and COMPUTE control signals including means for generating a series of clock pulses having a substantially constant repetition rate, preset digital counter means responsive to the simultaneous occurrence of said clock pulses and one of said control signals for providing an output signal upon the occurrence of a predetermined number of clock pulses, and means for generating said control signals, said means being connected to said preset counter means so that the length of said one control signal is determined by the number preset in said preset counter;

and means responsively connecting each of said computing elements to said iterative control means so that said elements operating in normal integrator modes track signals appearing at their respective initial condition inputs in response to said INITIAL CONDITION control signal, hold the tracked signal in response to the succeeding HOLD control signal, and integrate signals appearing at their respective integrate inputs in response to said COMPUTE control signal; and so that said elements operating in complementary integrator modes integrate signals appearing at their respective integrate inputs in response to said INITIAL CONDITION control signal, track signals appearing at their respective initial condition inputs in response to said COMPUTE control signal, and hold the tracked signal in response to the succeeding HOLD control signal.

2. An analog computer comprising:
a plurality of computing elements having respective integrate and initial condition input terminals, each of said computing elements being operable under external control to function in respective normal integrator and complementary integrator modes;
patchboard means connected to each of said computing elements for interconnecting said elements in a predetermined relationship;
iterative control means for sequentially generating INITIAL CONDITION, HOLD, COMPUTE and HOLD control signals;
and means responsively connecting each of said computing elements to said iterative control means so that said elements operating in normal integrator modes track signals appearing at their respective initial condition inputs in response to said INITIAL CONDITION control signal, hold the tracked signal in response to the succeeding HOLD control signal, and integrate signals appearing at their respective integrate inputs in response to said COMPUTE control signal; and so that said elements operating in complementary integrator modes integrate signals appearing at their respective integrate inputs in response to said INITIAL CONDITION control signal, track signals appearing at their respective initial condition inputs in response to said COMPUTE control signal, and hold the tracked signal in response to the succeeding HOLD control signal.

3. The analog computer defined in claim 2 comprising:
a function selector pinboard having a plurality of electrical contacts adapted for actuation by pins inserted in said pinboard;
and means connecting each of said computing elements to predetermined electrical contacts of said pinboard so that the mode of operation of said computing elements may be preselected by inserting pins in said pinboard.

4. The analog computer defined in claim 2 wherein:
for a complementary integrator mode, said computing elements are in the hold condition during the INITIAL CONDITION interval of the first iterative cycle.

5. The analog computer defined in claim 2 wherein:
each computing element comprises an amplifier;
a feedback capacitor connected between the input and output of said amplifier;
first means responsive to a first input signal for connecting said integrate input terminal to the input of said amplifier;
second means responsive to a second input signal for connecting said integrate input terminal to ground;
third means responsive to a third input signal for connecting said initial condition input terminal to the input of said amplifier and a feedback resistor between the input and output of said amplifier;
and means responsive to the external mode selection of normal integrator and complementary integrator for converting said INITIAL CONDITION, HOLD, COMPUTE and HOLD control signals to the appropriate first, second and third input signals.

6. The analog computer defined in claim 5 wherein:
for a normal integrator mode, said conversion means generates second and third input signals in response to an INITIAL CONDITION control signal, a second input signal in response to a HOLD control signal, and a first control signal in response to a COMPUTE control signal.

7. The analog computer defined in claim 5 wherein:
for a complementary integrator mode, said conversion means generates a first input signal in response to an INITIAL CONDITION control signal, a second input signal in response to a HOLD control signal, and second and third input signals in response to a COMPUTE control signal.

8. The analog computer defined in claim 7 wherein:
for a complementary integrator mode, said conversion means generates a second input signal in response to the INITIAL CONDITION control signal of the first iterative cycle.

9. An iterative analog computer control for generating sequential INITIAL CONDITION, first HOLD, COMPUTE and second HOLD control signals comprising:
means for generating a series of clock pulses having a substantially constant repetition rate whose period corresponds to the time width of said HOLD control signals;
initial condition control means responsive to the simultaneous occurrence of said clock pulses and said INITIAL CONDITION control signal for providing an output signal upon receipt of a predetermined number of said clock pulses;
multi-state means having four mutually exclusive stable states coupled to the output of said initial condition control means and being triggered into its second stable state thereby;
compute control means responsive to the simultaneous occurrence of said clock pulses and said COMPUTE control signal for providing an output signal upon receipt of a predetermined number of said clock pulses;
means connecting said multi-state means to the output of said compute control means so that said multi-state means is triggered into its fourth stable state by the output of said compute control means;
means responsive to the simultaneous occurrence of said clock pulses and said HOLD control signal coupled to said multi-state device for triggering said device into its first and third stable states;
and means responsively coupled to said multi-state device for converting (1) said first stable state into said INITIAL CONDITION control signal, (2) said second stable state into said first HOLD control signal, (3) said third stable state into said COMPUTE control signal, and (4) said fourth stable state into said second HOLD control signal.

10. The iterative analog computer control defined in claim 9 wherein:
said initial condition control means and said compute control means comprise respective preset digital counters.

11. An iterative analog computer control for sequentially controlling INITIAL CONDITION, HOLD, and COMPUTE control signals comprising:
means for generating a series of clock pulses having a substantially constant repetition rate whose period corresponds to the time width of said HOLD control signal;
preset digital counter means responsive to the simultaneous occurrence of said clock pulses and one of said control signals for providing an output signal upon receipt of a predetermined number of said clock pulses;

and means for generating said control signals, said means being responsive to the output of said preset digital counter means so that the length of said one control signal equals the period of said clock pulses multiplied by the quantity $(X+1)$ where X is the number preset in said preset counter.

12. An iterative analog computer control for sequentially controlling INITIAL CONDITION, HOLD, and COMPUTE control signals comprising:

means for generating a series of clock pulses having a substantially constant repetition rate;

preset digital counter means responsive to the simultaneous occurrence of said clock pulses and one of said control signals for providing an output signal upon the occurrence of a predetermined number of clock pulses;

and means for generating said control signals, said means being connected to said preset counter means so that the length of said one control signal is determined by the number preset in said preset counter.

13. An iterative analog computer control for sequentially controlling INITIAL CONDITION, HOLD, and COMPUTE control signals comprising:

means for generating a series of clock pulses having a substantially constant repetition rate;

an AND gate responsively connected to the series of clock pulses;

preset digital counter means responsive to the simultaneous occurrence of an output of said AND gate and one of said control signals for providing an output signal upon the occurrence of a predetermined number of clock pulses;

means for generating said control signals, said means being connected to said preset counter means so that the length of said one control signal is determined by the number preset in said preset counter;

an inhibit gate responsively connected to said means for generating said control signals and to a stop control and operatively connected to said AND gate so that said control may be stopped at the end of a predetermined control signal by activating said stop control thereby causing said inhibit gate to close said AND gate.

14. An analog computer element having the operational modes of a summer, an amplifier, an integrator, and a complementary integrator comprising:

an amplifier;

first switch means connecting an integrate input terminal and first input resistor to the input of said amplifier;

second switch means connecting said first input resistor to ground;

third switch means connecting an initial condition input terminal and second input resistor to the input of said amplifier;

a first feedback resistor connected between said second input resistor and the output of said amplifier;

fourth switch means connecting a second feedback resistor between the input and output of said amplifier;

fifth switch means connecting a capacitor between the input and output of said amplifier;

and means for selecting the desired operational mode connected to said fourth and fifth switching means so that said fourth switch means disconnects said second feedback resistor for the modes of an amplifier, an integrator, and a complementary integrator; and so that said fifth switch means disconnects said capacitor for the modes of a summer and an amplifier.

15. An analog computer comprising:

a pair of normal integrators;

a complementary integrator;

an iterative control means for sequentially generating INITIAL CONDITION, HOLD, COMPUTE and HOLD control signals;

means responsively connecting said normal integrators to said iterative control means so that said normal integrators track an initial condition input signal in response to said INITIAL CONDITION control signal, hold said tracked signal in response to said HOLD control signal, and integrate an integrate input signal in response to said COMPUTE control signal;

means responsively connecting said complementary integrator to said iterative control unit so that said complementary integrator integrates an integrate input signal in response to said INITIAL CONDITION control signal, tracks an initial condition input signal in response to said COMPUTE control signal, and holds said tracked signal in response to said HOLD control signal;

and means connecting the output of one of said normal integrators as the initial condition input of said complementary integrator and the output of said complementary integrator as the initial condition input of said other normal integrator so that said complementary integrator integrates while using the previously computed data of said normal integrator as its initial conditions and said other normal integrator integrates while using the previously computed data of said complementary integrator as its initial conditions thereby enabling the solution of a problem described by two different sets of equations where the initial conditions for each depend on previously computed data from the other.

16. An analog computer comprising:

time base means for generating a sequentially occurring control signal whose period may be preselected;

an amplifier;

a plurality of weighted capacitors;

switching means for connecting each of said capacitors between the input and output of said amplifier;

and means operatively connecting said time base means to said switching means so that the appropriate feedback capacitor is automatically connected in accordance with the preselected time base.

17. An analog computer comprising:

first and second computing elements each having the functional operating modes of integrating, holding, and tracking;

and means connected to said first and second computing elements for operating same in respectively opposite modes of integrating and tracking, and common modes of holding.

References Cited by the Examiner

UNITED STATES PATENTS 2,958,466 11/1960 Alway ------------- 235—184

OTHER REFERENCES

Pages 1540 to 1544, Andrews, "The Dynamic Storage Analog Computer, DYSTAC."

Pages 1545 to 1549, Gilliand et al., "Use of Analog Memory for Simulation of a Melting Slab."

Pages 1551 to 1553, Korn, "Repetitive Analog Computers at the University of Arizona."

All above in Instruments and Control Systems, September 1960.

16 pages, Sept. 29, 1958, Philbrick, "Utility Packaged Amplifier, UPA–2."

MALCOLM A. MORRISON, *Primary Examiner.*

DARYL W. COOK, *Examiner.*

UNITED STATES PATENT OFFICE

CERTIFICATE OF CORRECTION

Patent No. 3,231,723 January 25, 1966

Maxwell C. Gilliland et al.

It is hereby certified that error appears in the above numbered patent requiring correction and that the said Letters Patent should read as corrected below.

Column 1, line 12, for "interative" read -- iterative --; column 2, lines 39 and 40, for "interation" read -- iteration --; column 3, line 9, after "a" insert -- given --; column 4, line 18, for "C" read -- $\bar{C}$ --; column 5, line 74, for "relay", second occurrence, read -- relays --; column 9, line 28, after "pulse" insert -- 154 --; line 30, for "52)." read -- 52.) --; line 34, for "driven)." read -- driven.) --; column 12, line 40, for "vie" read -- via --; column 18, line 61, for "Gilliand" read -- Gilliland --.

Signed and sealed this 1st day of August 1967.

(SEAL)

Attest:

EDWARD M. FLETCHER, JR.
Attesting Officer

EDWARD J. BRENNER
Commissioner of Patents